May 16, 1939.  W. SCRIMGEOUR  2,158,593
HYPODERMIC SYRINGE
Filed April 14, 1937
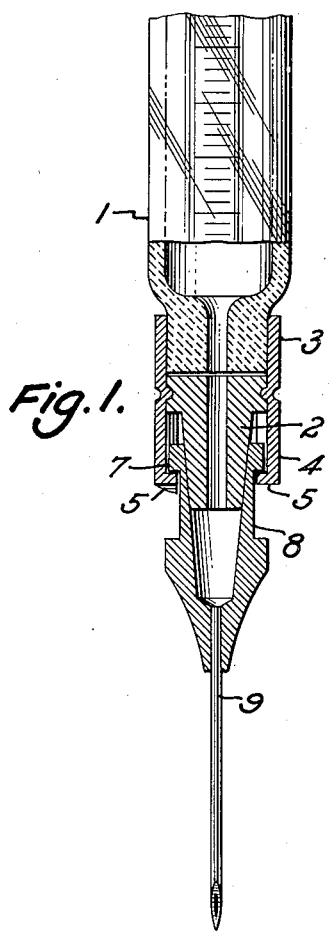
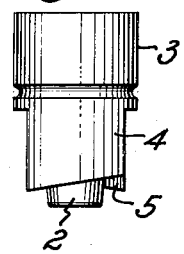
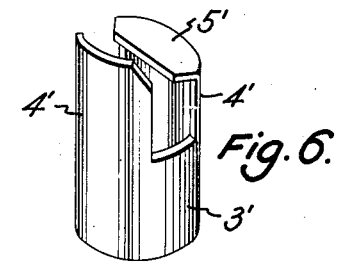
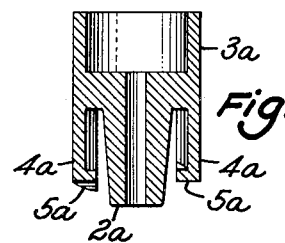
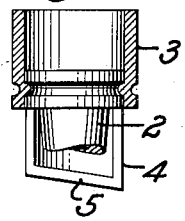
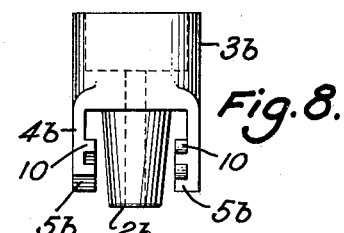
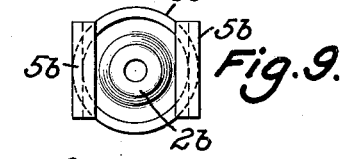
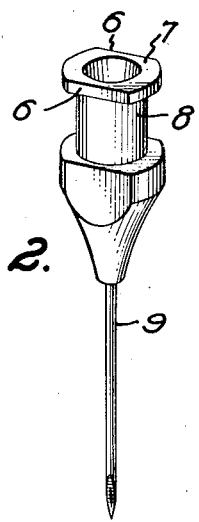
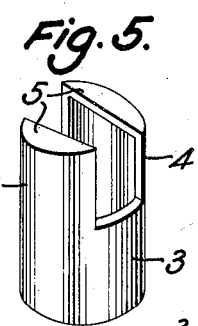
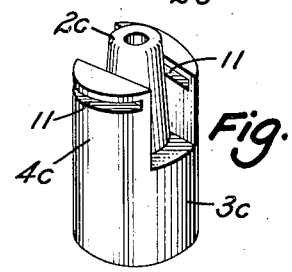
Inventor:
William Scrimgeour
By Potter, Pierce & Scheffler,
Attorneys.

Patented May 16, 1939

2,158,593

UNITED STATES PATENT OFFICE 2,158,593

HYPODERMIC SYRINGE

William Scrimgeour, Washington, D. C., assignor to William Scrimgeour, engineer and contractor, a partnership consisting of William Scrimgeour, Lula McA. Scrimgeour, C. Maxwell Scrimgeour, and C. Bailey Scrimgeour, Washington, D. C.

Application April 14, 1937, Serial No. 136,942

6 Claims. (Cl. 128—221)

This invention relates to hypodermic syringes and more particularly to the metal nozzle by which the needle is detachably connected to the syringe.

Objects of the invention are to provide syringes, or nozzle fittings for syringes, which are characterized by the simple design and sturdy construction of the parts which interlock with the hub of the hypodermic needle. An object is to provide a syringe nozzle having undercut lateral extensions spaced from the nozzle for interlocking with projections on the hub of the needle. Another object is to provide a syringe including a tapered nozzle to which circumferentially spaced members are attached for interlocking with the projections on the hub of the syringe needle. More particularly, an object is to provide a metal fitting for attachment to a glass tube to form a syringe, the fitting including a tapered nozzle for receiving the correspondingly tapered hub of a needle and two diametrically opposed and oppositely inclined plane surfaces spaced from the nozzle for interlocking with lateral projections on the needle hub.

These and other objects and advantages of the invention will be apparent from the following specification when taken with the accompanying drawing in which:

Fig. 1 is a fragmentary side elevation, with parts in section, of an embodiment of the invention;

Fig. 2 is a perspective view of a common type of needle that may be used with syringes such as contemplated by this invention;

Figs. 3 and 4 are, respectively, a side elevation and a fragmentary sectional view of the nozzle structure of Fig. 1;

Fig. 5 is a perspective view of the nozzle supporting element before its attachment to the nozzle;

Fig. 6 is a perspective view of a blank in an intermediate stage in the formation of the supporting element from a tube;

Fig. 7 is a fragmentary sectional view of another embodiment;

Figs. 8 and 9 are side and end elevations, respectively, of another form of the invention;

Fig. 10 is a side elevation of a further modification, and

Fig. 11 is an end view of a nozzle structure for insuring a predetermined relation between the beveled point of the needle and the graduated scale of the syringe barrel.

In the drawing, the reference numeral 1 identifies the graduated glass barrel or syringe to which the tapered nozzle 2 is secured by the cylinder 3. The nozzle and its supporting member are separately formed, and the nozzle base has a circumferential groove into which the relatively thin wall of the metal cylinder 3 is crimped to connect the parts before the assembly is cemented to the glass barrel in the usual manner.

The cylinder 3 has opposed longitudinal extensions 4 of arcuate form in transverse cross-section that terminates short of the end of nozzle 2 in inturned flanges 5 of segment shape in plan that are oppositely inclined planar surfaces. The opposed edges of flanges 5 terminate at the side edges of extensions 4 and lie in spaced parallel planes to receive the flattened sides 6 of the end flange 7 on the tapered hub 8 which carries the needle 9. The length and inclination of the flanges 5 are such that a needle hub may be loosely placed on the nozzle 2, and then firmly clamped upon the nozzle by rotating the needle hub to engage the projections 7 beneath the flanges 5. As shown in Figs. 1 and 2, the thickness of flange 7 is not critical, as is the case when the flange projections engage a screw thread, and the needle will be securely locked to the nozzle when the lower face of the flange 7 is properly located.

As indicated by Figs. 5 and 6, the cylinder 3 and its flanged extensions may be formed from a short tubular blank 3' by slotting the blank diametrically to form the extensions 4' and then pressing or stamping the ends of the extensions to form flanges 5'. The stamped flanges are then milled or sheared off to leave the opposed edges in parallel planes.

The nozzle and interlocking structure may be economically manufactured with high uniformity by simple metal working processes and the finished article has desirable characteristics. The beveled face of the needle will be located in one of two diametrically opposed positions with respect to the graduated scale of the barrel 1, and the spaced arrangement of the extensions 4 facilitates the sterilization of the syringe since there are no pockets at the base of the nozzle 2.

The separate formation of the nozzle 2 and cylindrical mounting member has advantages from the standpoint of simplicity of manufacture, but the nozzle and mount may be formed as an integral member, as shown in Fig. 7. The nozzle 2a is integral with the cylinder 3a and extensions 4a which carry the locking flanges 5a.

As shown in Figs. 8 and 9, the cylinder 3b which carries the nozzle 2b may merge into flat side plates 4b which carry spaced flanges 5b and 10 between which the flange projections 7 of the needle hub are engaged. A nozzle structure of this type may be formed as a die-casting or from a tubular blank and separate nozzle by bending metal from the extensions 4b inwardly to form the flanges 10.

The embodiment shown in Fig. 10 includes soide extensions 4c of sectional cross-section on the cylinder 3c. Slots 11 are cut through the extensions 4c adjacent their outer and oppositely inclined ends to receive the projections of the needle hub.

As noted above, a predetermined orientation of the beveled face of the needle with respect to the flattened surface of the flange 7 will result in the location of the beveled face in one of two diametrically opposed positions with respect to the graduations of the syringe barrel. A location of the beveled face in approximately one definite position with respect to the graduations may be insured by forming flanges 5d and 5e which are non-symmetrical with respect to the cylindrical support 3d; the hub of the needle being provided with similar non-symmetrical projections.

The several illustrated embodiments of the invention indicate that there is considerable latitude in the shapes and relationships of the component parts which make up the syringe and it is to be understood that various modifications fall within the spirit of my invention as set forth in the following claims.

I claim:

1. In a syringe, the combination with a barrel and nozzle, of a pair of diametrically opposed members of arcuate form in transverse cross-section extending along and spaced from the nozzle, said members terminating in inturned flanges of segment shape and opposite inclination for interlocking with projections upon the hub of a needle that is to be secured to said nozzle, the edges of the flanges terminating at the side edges of the respective side members.

2. In a hypodermic syringe, the combination with a needle having a hub provided with oppositely extending projections, of a syringe barrel, a tapered nozzle secured to said barrel for receiving said hub, and spaced members fixed to and extending along said nozzle, said members terminating in inturned rigid planar flanges of opposite inclination and having opposed edges in spaced parallel planes for interlocking with the projections of said needle hub.

3. The invention as claimed in claim 2, wherein said spaced members are diametrically opposed extensions on a thin walled cylinder formed independently of and rigidly secured to said nozzle.

4. In a hypodermic syringe, a nozzle support and locking member, said member comprising a thin walled cylindrical member having a pair of circumferentially spaced extensions terminating in opposed flanges of planar form and opposite inclination, said flanges being of segment shape with opposed edges terminating at the side edges of said spaced extensions.

5. A syringe comprising a barrel, a tapered nozzle attached to said barrel, and diametrically opposed members secured to and extending along said nozzle, said members terminating short of said nozzle in opposed planar flanges of segment shape and opposite inclination with respect to the axis of said nozzle, the opposed edges of said flanges being non-symmetrical with respect to the axis of said nozzle.

6. In a hypodermic syringe, the combination with a barrel and a tapered nozzle for receiving the hub of a needle, of opposed members of segmental cross-section secured to and extending along said nozzle, said members being spaced from the nozzle and terminating short of the outer end thereof in oppositely inclined plane surfaces, said members having slots extending therethrough adjacent and parallel to the respective plane surfaces.

WILLIAM SCRIMGEOUR.